United States Patent [19]

Smith et al.

[11] Patent Number: 4,800,716
[45] Date of Patent: Jan. 31, 1989

[54] EFFICIENCY ARCJET THRUSTER WITH CONTROLLED ARC STARTUP AND STEADY STATE ATTACHMENT

[75] Inventors: William W. Smith; Steven C. Knowles, both of Seattle, Wash.

[73] Assignee: Olin Corporation, Stamford, Conn.

[21] Appl. No.: 889,451

[22] Filed: Jul. 23, 1986

[51] Int. Cl.$^4$ ............................................... F03H 1/00
[52] U.S. Cl. ............................... 60/203.1; 219/121.57; 313/231.41
[58] Field of Search ................. 60/203.1; 313/231.41, 313/231.51; 219/121 PW, 122

[56] References Cited

U.S. PATENT DOCUMENTS

| | | | |
|---|---|---|---|
| 2,850,662 | 9/1958 | Gilruth et al. | 60/203.1 |
| 3,353,060 | 11/1967 | Yamamoto et al. | 219/121 PW |
| 3,359,734 | 12/1967 | Ferrie et al. | 60/203.1 |
| 3,425,223 | 2/1969 | Browning | 60/203.1 |
| 3,651,644 | 3/1972 | Breen et al. | 60/203.1 |
| 3,692,431 | 9/1972 | Gebel | 60/203.1 |
| 4,370,539 | 1/1983 | Garlanov et al. | 219/121 PW |
| 4,577,461 | 3/1986 | Cann | 60/203.1 |

FOREIGN PATENT DOCUMENTS 1368255  1/1964  France ............................... 60/203.1

Primary Examiner—Louis J. Casaregola
Attorney, Agent, or Firm—Bruce E. Burdick

[57] ABSTRACT

An improved efficiency arcjet thruster has a constrictor and electrically-conductive nozzle anode defining an arc chamber, and an electrically-conductive rod having a tip spaced upstream from the constrictor and defining a cathode spaced from the anode by a gap generally coextensive with the arc chamber. An electrical potential is applied to the anode and cathode to generate an electrical arc in the arc chamber from the cathode to anode. Catalytically decomposed hydrazine is supplied to the arc chamber with generation of the arc so as to produce thermal heating and expansion thereof through the nozzle. The constrictor can have a electrically insulative portion disposed between the cathode tip and the nozzle anode, and an electrically-conductive anode extension disposed along the insulative portion so as to define an auxiliary gap with the cathode tip substantially smaller than the gap defined between the cathode and nozzle anode for facilitating startup of arc generation. The constrictor can also include an electrically-conductive electrode with a variable electrical potential to vary the shape of the arc generated in the arc chamber. Also, the cathode is mounted for axial movement such that the gap between its tip and the nozzle anode can be varied to facilitate a generally nonerosive generation of the electrical arc at startup and reliable steady state operation. Further, the arc chamber can have a nonparallel subsonic-to-supersonic transition configuration, or alternatively solely a nonparallel supersonic configuration, for improved arc attachment.

6 Claims, 3 Drawing Sheets

EFFICIENCY ARCJET THRUSTER WITH CONTROLLED ARC STARTUP AND STEADY STATE ATTACHMENT

The invention described herein was made in the performance of work under NASA Contract No. NAS 3-24631 and is subject to the provisions of Section 305 of the National Aeronautics and Space Act of 1958 (72 Stat. 435; 42 U.S.C. 2457). The Government has waived its patent rights in waiver case No. AW-2535.

BACKGROUND OF THE INVENTION

1. Field of the Invention

The present invention generally relates to small propulsion systems for maneuvering spacecraft and, more particularly, is concerned with an arcjet thruster incorporating features which control arc startup and steady state attachment for improved efficiency and optimized performance of the thruster.

2. Description of the Prior Art

As conventionally known, an arcjet thruster converts electrical energy to thermal energy by heat transfer from an arc discharge to a flowing propellant and from thermal energy to directed kinetic energy by expansion of the heated propellant through a nozzle. For an explanation from an historical perspective of arcjet thruster construction and operation and the problems associated with this type of electrothermal propulsion, attention is directed to the following publications: "Arcjet Thruster for Space Propulsion" by L. E. Wallner and J. Czika, Jr., NASA Tech Note D-2868, June 1965; "The Arc Heated Thermal Jet Engine" by F. G. Penzig, AD 671501, Hollomen Air Force Base, March 1966; and "Physics of Electric Propulsion" by R. G. Jahn, McGraw-Hill Book Company, 1968. Attention is also directed to U.S. Pat. No. 4,548,033 to G. L. Cann.

Although standard constricted arc-heated thrusters have been developed since the early 1960's, using $NH_3$ or $H_2$ and producing typically 30% efficiency, these arcjet thrusters have suffered extreme difficulty in starting and have associated therewith very high erosion rates on startup. Heretofore, there has been no way devised to control effectively arc startup and steady state attachment so as to reduce erosion of the thruster block and prolong its life. The arc tends to form as a concentrated radial spike which attaches to the block at a contact point in a subsonic zone thereof, causing at worst complete destruction of the thruster and at best serious pitting and erosion thereof which decreases the number of cycles that can be expected from the thruster. Additionally, the performance and efficiency of these arcjet thrusters are by no means optimized. Recent experimental data have shown that significant gains can be obtained over the performance and efficiency levels reported in the early 1960's. More gains are possible through proper design modifications.

Consequently, a need exists for a fresh approach to arcjet thruster design which will address the problems experienced heretofore with performance and efficiency, and with arc startup and attachment and substantially mitigate their deleterious effects without substituting another, equally stringent, set of problems in their place.

SUMMARY OF THE INVENTION

The present invention provides an improved efficiency arcjet thruster designed to satisfy the aforementioned needs. The present invention encompasses several different features, unknown in the prior art, which substantially ameliorate the problems historically encountered with arcjet thrusters and have promise for making an arcjet thruster an economical and reliable propulsion system for maneuvering spacecraft. Most of the features are advantageously incorporated together in the same arcjet thruster to realize significantly improved efficiency and optimized performance, although in certain instances the advantages to be derived from some of the features can be employed separately from the others in different thrusters.

One feature relates to the use of hydrazine catalytic decomposition chamber to feed an electric arc heater to produce superheated, partially ionized propellant usable for propulsion.

Another feature is directed to the use of a movable cathode rod with associated regulation of the propellant mass flow and electric current to control the arc gap, arc attachment and current surge. Minimizing the gap, current and propellant flow during startup reduces erosion and power requirements. After startup, the cathode can be moved for positioning attachment of the arc within the supersonic, diffusion flow zone of the nozzle for optimal performance and minimal erosion.

Still another feature concerns the use of an electrically insulative material to form the constrictor of the thruster block in the predominantly subsonic zone thereof. The insulative constrictor provides a purely axial electric field and current pathway between the cathode and nozzle anode located downstream of the constrictor. In such manner, radial electron migration is minimized and the arc core is confined to a very small cross-sectional area with maximum resistance. Current "loss" due to electron diffusion to the constrictor wall is also eliminated.

Yet another feature relates to the use of an electrically conductive starter rail in conjunction with the electrically insulative constrictor in order to minimize starting currents and thereby breakdown voltage upon startup and allow a "soft start" technique to be applied to minimize erosion and enhance thruster lifetime.

A further feature is the use of an adjustable or "floating" electrode, which can selectively have a positive or negative potential, in the area of the constrictor of the thruster to control the radial electric field and thereby the diameter of the arc core for optimal performance and enhanced efficiency.

A final feature is the use of constrictors having a nonparallel subsonic-to-supersonic transition configuration to provide optimum position of arc attachment for enhanced efficiency and arc stability. Constrictors configured to provide low pressure supersonic zones in which arc attachment occurs ensure that the arc is diffusively attached, thereby reducing erosion. In high pressure zones, arc attachment is more confined and as a result energy transfer is more concentrated and erosive.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings, in which.

DETAILED DESCRIPTION OF THE INVENTION

Figure 1:
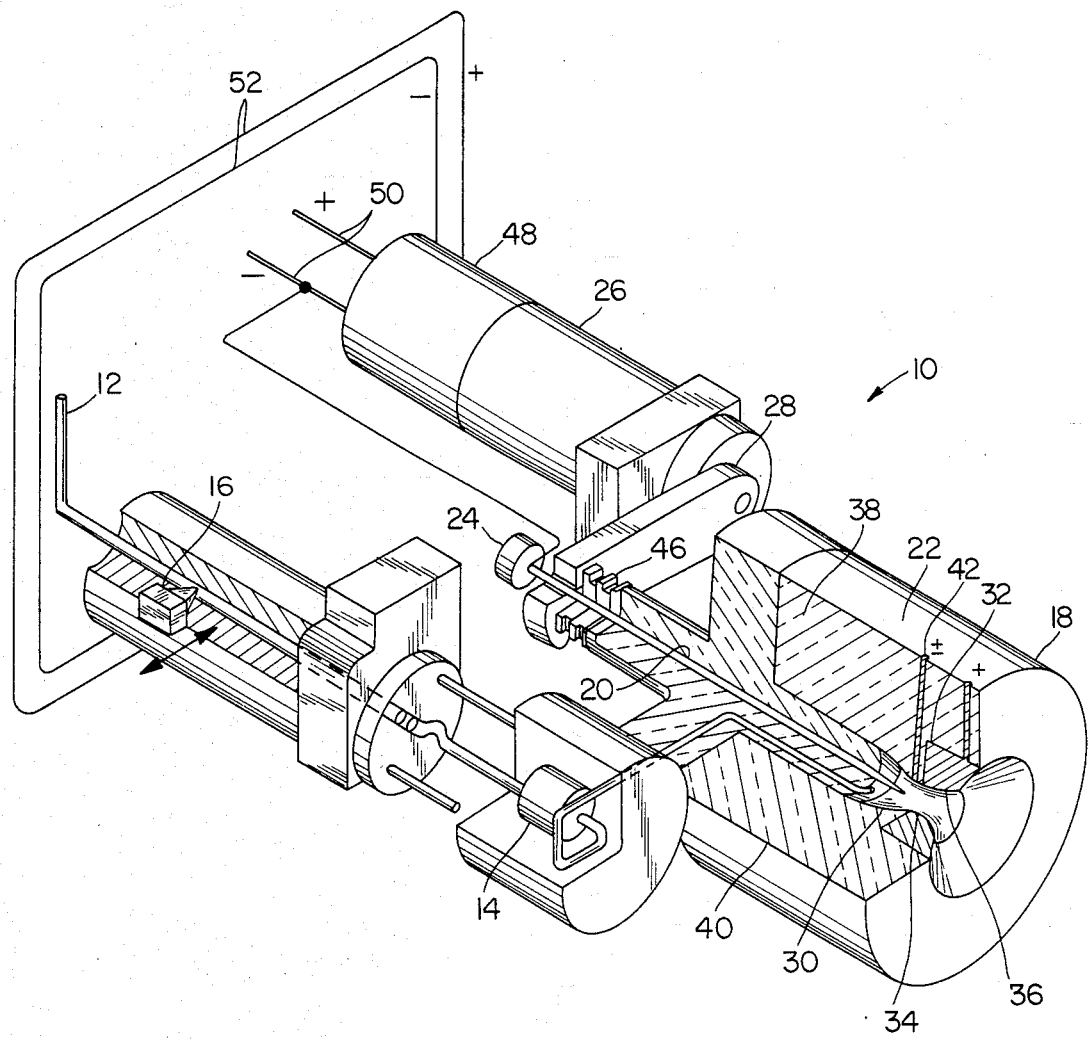
FIG. 1 is a schematical perspective representation of an improved efficiency arcjet thruster which incorporates the features of the present invention.

In the following description, like reference characters designate like or corresponding parts throughout the several views of the drawings.

IN GENERAL

Referring now to the drawings, and particularly to FIG. 1, there is shown a schematical representation of an improved efficiency arcjet thruster, generally indicated by the numeral 10, which incorporates the features of the present invention. The arcjet thruster 10 has an infeed conduit 12 in flow communication with a catalytic decomposition chamber 14 through a throttle valve 16. When a propulsive thrust impulse is demanded, a liquid monopropellant, such as hydrazine ($N_2H_4$), is fed through the conduit 12 and introduced via the throttle valve 16 into the decomposition chamber 14. Inside the chamber 14, a suitable catalyst, such as Shell 405, is used in a conventional manner to decompose the liquid hydrazine into a gaseous mixture of $N_2$, $H_2$, and $NH_3$. Due to the exothermic reaction, this gaseous mixture is at an elevated temperature, such as approximately 1500 degrees F.

The arcjet thruster 10 also has a block 18 with a central channel 20 in a rearward portion thereof through which extends a cathode 22 in the form of an elongated electrically-conductive cylindrical rod. The cathode 22 is coupled at its trailing end 24 to a positioning motor 26 by a rotational motion transmitting mechanism 28 for axially moving the cathode in a fore-and-aft direction. At its leading end, the cathode 22 has a conical-shaped tip 30 which extends into the upstream end of an arc chamber 32 formed by a constrictor 34 and nozzle anode 36 defined at the forward portion of the block 18.

The block 18 also has a heat exchanger 38 defined therein which surrounds the forward portion of the cathode 22 with a passage 40 leading from the decomposition chamber 14 through the heat exchanger 38 to the arc chamber 32. The preheated gaseous mixture is routed through the passage 40 from the decomposition chamber 14 to the arc chamber 32. An electric arc is established in the arc chamber 32 defined by the constrictor 34 and nozzle anode 36 which is stabilized through gas dynamic/plasma pressure force balance in the constrictor 34. The electric arc eminates from the tip 30 of the cathode 22 through the constrictor 34 to the nozzle anode 36. The arc-to-gas energy transfer in the arc chamber 32 is quite substantial and bulk average temperatures of 7000-9000 degrees F. have been achieved therein.

The thruster block 18 employs a variable "floating" electrode 42 to control the radial electric field and optimize the distribution of electron current carriers in part of the constrictor 34. An electrically insulative material 44 is used in the constrictor 34 to eliminate the radial electric field, and hence, confine current carriers to the gas stream through the constrictor.

Figure 2:
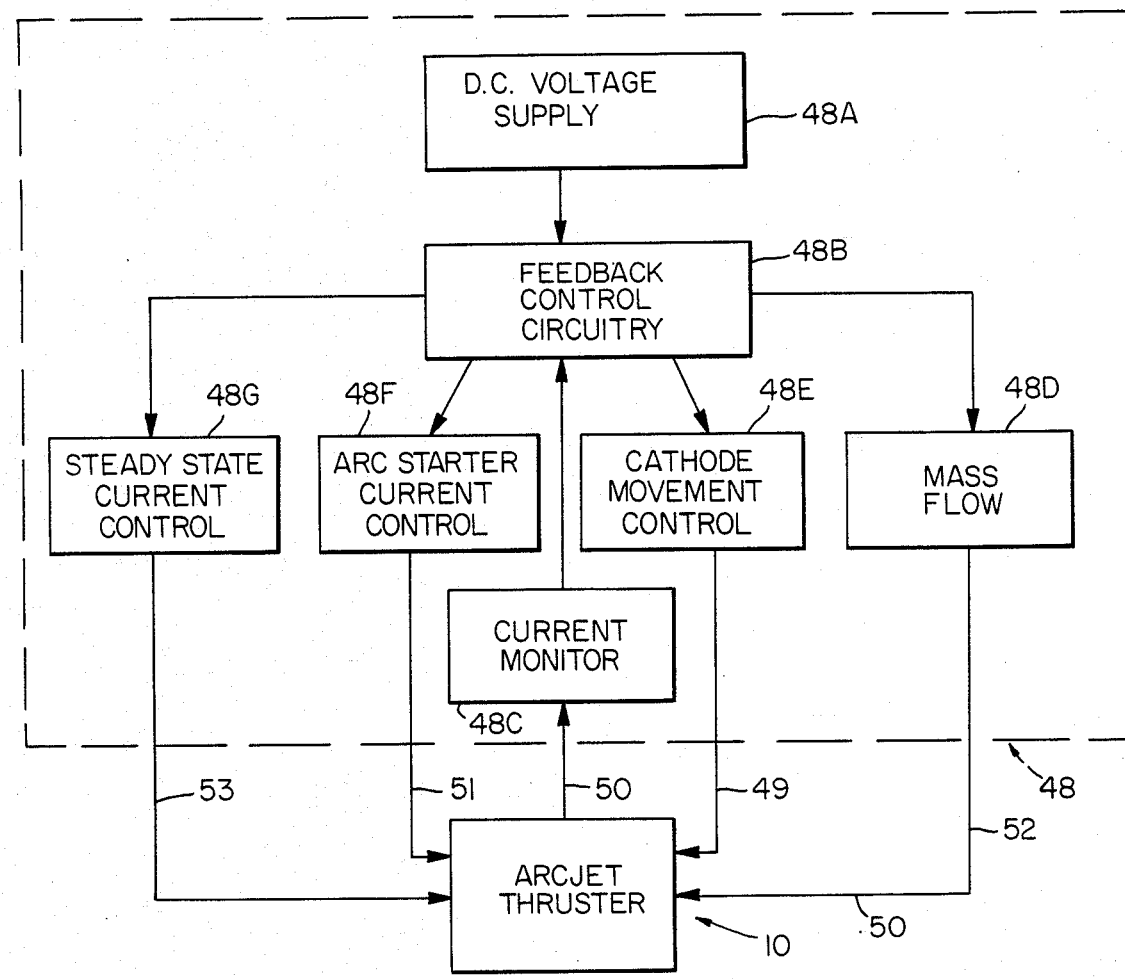
FIG. 2 is a schematical block diagram of the arcjet thruster control circuit.

At arc startup the position of the cathode 22 relative to the nozzle anode 36 can be changed by the cathode positioning motor 26 and drive mechanism 28. The cathode 22 is sealed at its trailing edge 24 by metal bellows 46 which are associated with the motion transmitting mechanism 28. A arcjet thruster control circuit 48 is provided, being powered by voltage supply 48A. The circuit 48, being illustrated in greater detail in FIG. 2, monitors and commands thruster operation through controls 48B-48G. Specifically, the control circuit 48 senses the current being drawn in lines 50 connected to the cathode 22 for generating the arc and moves the cathode 22 backward during start. Commands to the cathode positioning motor 26 on line 49 are issued by the control circuit 48 during startup procedure. During the cathode withdrawal process the current is increased by the control circuit 48 via line 51 to operating levels and, at the same time, the throttle valve 16 is commanded via lines 52 by the control circuit 48 to increase mass flow of liquid monopropellant to operating levels, with the result that the arc is brought up to a steady state operating condition and controlled thereat by the circuit 48 via line 53.

With the above overall make-up and mode of operation of the arcjet thruster 10 in mind, most of the features of the present invention just briefly mentioned above will now be covered in greater detail.

Soft Start Capability and Starter Rail

As described above, the positionable cathode 22 and the drive motor 26 and the motion transmitting mechanism 28 for remotely controlling the position of the cathode 22 serve to both allow a nonerosive start and to control arc attachment during steady state operation. With a fixed cathode, the initial current surge upon arcjet startup has been shown to cause severe life-limiting erosion to both the cathode and the thruster block 18. The positionable cathode 22 in combination with mass flow regulation of the preheated gaseous mixture allows a low erosion startup method, i.e., a soft start, to be employed.

In the startup method, the cathode 22 is first moved close to the constrictor 34 which is almost part of the anode in absence of the insulative material 44. Thus, at startup only an initial small gap, such as within the range of zero up to 0.1 inch, is present between the cathode 22 and constrictor 34. A low voltage, low current arc is then initiated. The low power level heats up the cathode 22 and the constrictor 34 without the detrimental thermal shock effects of a high power fixed cathode start. Once the arc is initiated, the cathode 22 is moved back by operation of the positioning motor 26 and motion transmitting mechanism 28. Simultaneously, the arc current and mass flow of the gaseous mixture are increased to steady state operating points.

Figure 3:
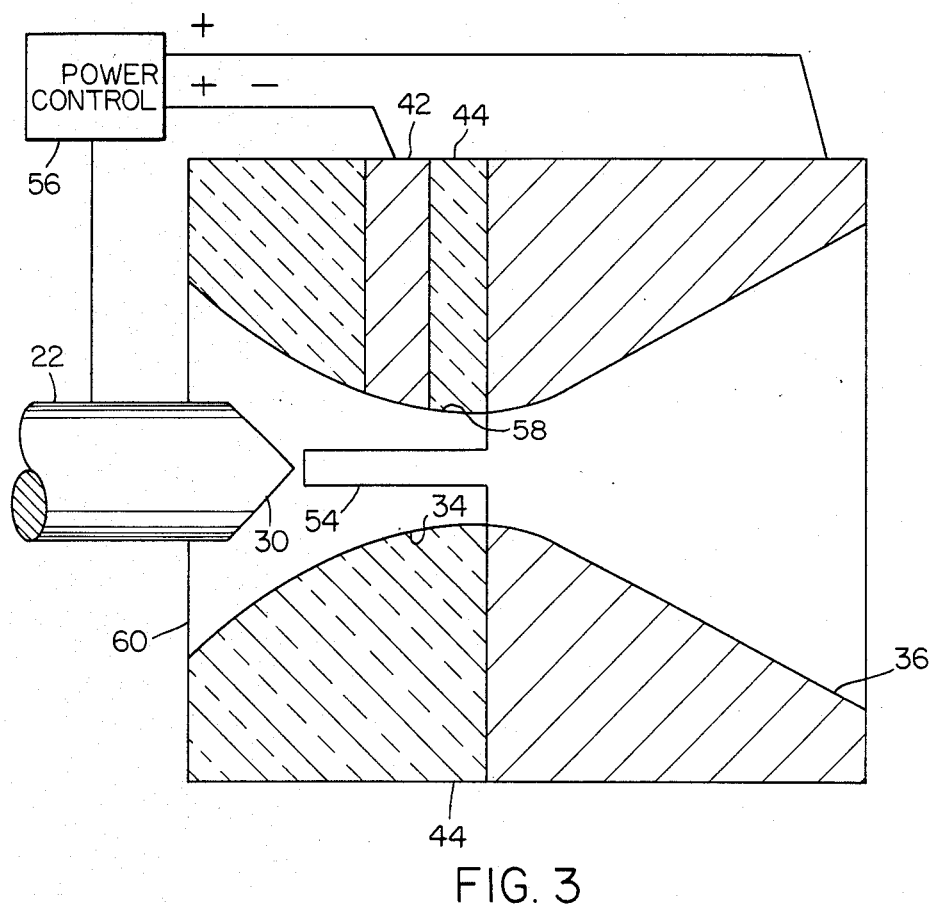
FIG. 3 is a schematical axial sectional view of a first embodiment of the thruster constrictor and nozzle incorporating many of the features of the present invention and having a nonparallel subsonic-to-supersonic transition configuration.

If the electrically insulative meterial 44 is used in the constrictor 34 for purposes to be described below, then it is readily understood that the path to the nozzle anode 36 is lengthened and arc startup is made more difficult in that more power is needed to generate an arc with increased erosive effects on the cathode 22 and thruster block 18. In order to overcome this difficulty, as seen in FIG. 3 a starter rail or extension 54 of the nozzle anode 36 extending upstream therefrom through the insulative constrictor 34 and exposed to the arc chamber 32 therein is provided to serve as the anode during startup procedures. The rail 54 is disposed in a cutout made in the inner periphery of the insulative material 44. While a single rail 54 is shown in FIG. 3, it should be understood that it can take other forms. Thus, at startup the tip 30 of the cathode 22 is positioned close to the upstream end of the starter rail 54 of the nozzle anode 36. The use of the starter rail 54 when the insulative material 44 is present will minimize the required voltage breakdown and subsequent current surge. Once steady state conditions are reached, the arc is merely blown downstream past the starter rail 54 to the flared portion of the nozzle anode 36, and so the rail then serves no purpose.

The positionable cathode 22 is also used to control the arc attachment point during steady state conditions. For a given current, flow rate, and nozzle geometry, the arc length is determined by the balance between the thermal and gas dynamic relations for an arc generated between the cathode 22 and nozzle anode 36. By accurately positioning the cathode 22, the arc attachment point can be moved downstream along the flared wall of the nozzle anode 36. Optimization of performance and minimization of erosion are achieved by ensuring that arc attachment occurs in the diffuse zone of the flared nozzle anode 36 downstream of the constrictor 34.

Electrically Insulative Material in Constrictor

As seen in FIG. 3, the upstream two-thirds of the constrictor 34 of the thruster block 18 is composed of the electrically insulative material 44, such as boron nitride, alumina, beryllia, or the like. The principal heat transfer in an arcjet is from ohmic heating in the arc core (central portion of the arc) and subsequent convection of this energy to the surrounding gas. Ohmic heating is directly proportional to the current level, and the current level is directly proportional to the number of electrons emitted at the cathode 22.

To maximize the effect of ohmic heat transfer the electrons must be kept in the arc core or the surrounding superheated gas for the maximum distance attainable. Heretofore, the walls of the constrictor have always been electrically conductive metallics are grounded. Hence a conductive path from the core of the arc through the gas to the wall was available. An analysis was performed which predicated a significant amount of the current could be lost to "electron diffusion" to the walls and, correspondingly, a loss of efficiency. In a test performed using the insulative material 44 in the constrictor 34 of the thruster, an efficiency of 47% at 630 $lb_f$-s/$lb_m$ (pounds of force-second per pounds of mass) specific impulse with $NH_3$ was measured. These numbers reflect a performance improvement of 30–50% over previously demonstrated arcjet thrusters in this power range.

Thus, the use of the insulative material 44 in the constrictor 34 forces the current to take a longer path to reach the nozzle anode 36. This retains the electrons in the arc core and surrounding gaseous mixture for a longer time, enhancing ohmic heating of the flowing gaseous mixture.

Floating or Controlled Constrictor Electrode

In order to either broaden or further constrict the arc column extending through the constrictor 34, a secondary field effect electrode, called the floating electrode 42, is used. It should be mentioned that the previously-described insulative constrictor material 44 may be employed with or without the floating electrode 42. The electrode 42 can take various forms. For instance, it can be shaped as a ring or donut. When the insulative material 44 is present, the electrode 42 will extend radially through it, as seen in FIG. 3.

However, the floating electrode 42 does not serve as an arc attachment point. It is held at a secondary positive or negative potential relative to the cathode 22 by means of a power controller 56, seen in FIG. 3. At steady state operation, the power controller 56 applies a fixed negative and positive potential respectively to the cathode 22 and nozzle anode 36, whereas the potential of the floating electrode 42 can be varied, either positive or negative, relative to the cathode. Fine tuning of the arc broadening can be obtained by adjustment of the potential of the floating electrode 42.

In summary, therefore, the purpose of the floating electrode 42 is to shape the arc as it goes through the constrictor 34. It is desirable to have as straight or flat an arc as possible as it goes through the arc chamber 32 within the constrictor 34 so that it will take a longer path to the nozzle anode 36. The arc will then be prevented from just contacting the nearest point of the nozzle anode 36 as it reaches the downstream portion of the constrictor 34. Thus, the voltage potential imposed on the electrode 42 is varied in accordance with how the arc is shaped and what further refinement thereof is desired. As mentioned above, the floating electrode 42 is optional and can be employed with or without the insulative material 44 being present in the constrictor 34 of the thruster 10.

Constrictors with Nonparallel Subsonic to Supersonic Transitions

The object of the aforementioned floating electrode 42 and insulative constrictor material 44 together with the nonparallel shape of the constrictor 34 is to make the arc take a longer path so that it will reach the supersonic zone of the nozzle anode 36 where it will make a diffuse attachment with the anode. The arc attachment mode in an arcjet directly determines the rate of erosion during startup and transient operation. Erosion is higher in higher pressure subsonic attachment than for low pressure supersonic attachment. The high pressure arc is more columnar—hence concentrating energy in a small space—whereas the low pressure arc is more diffuse—hence spreading energy in a broader space. Establishing and maintaining low pressure supersonic arc attachment is critical to obtaining arcjet lifetimes of hundreds of hours with many startup cycles.

Two alternative arcjet thruster constrictor configurations have been developed to reduce startup erosion and to ensure that the arc is diffusely attached in the supersonic low pressure zone. The constrictor 34 in FIG. 3 has a substantially parallel subsonic-to-supersonic transition point configuration which entails no sharp edges, a throat or sonic point 58 located approximately halfway down the length of the arc column, and a smooth, continuous contour from the inlet region 60 to the nozzle anode 36. Approximately half of the arc is in a subsonic zone to the left of sonic point 58 and half in the supersonic zone to the right of point 58.

Figure 4:
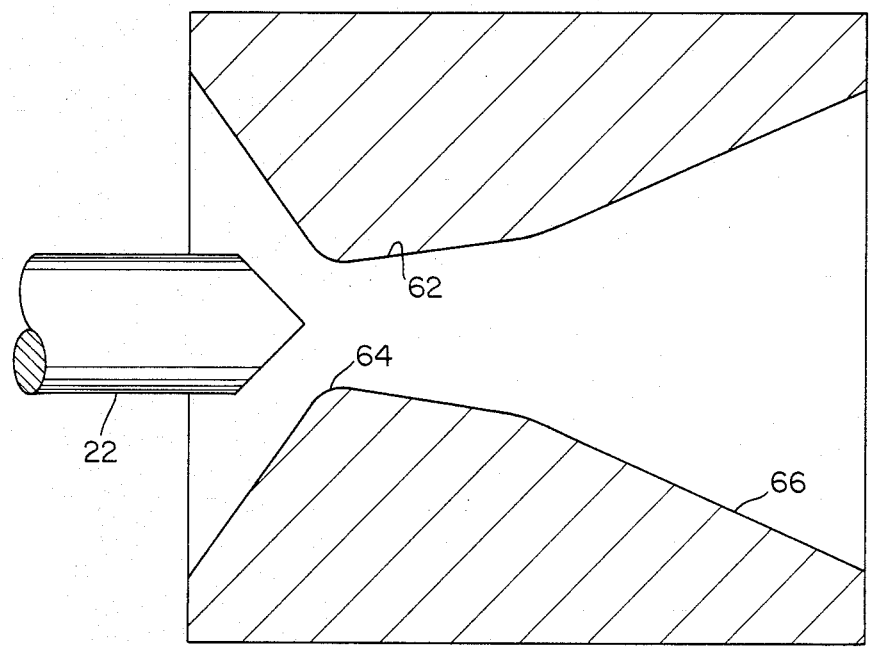
FIG. 4 is a schematical axial sectional view of a second embodiment of the thruster constrictor and nozzle having a nonparallel subsonic-to-supersonic transition configuration which is an alternative to the configuration of the nozzle of FIG. 3.

The alternative constrictor 62 in FIG. 4 has a substantially nonparallel supersonic configuration. It forces the arc through its sonic point 64 almost immediately downstream of the arc origin at the cathode 22. Greater than 90% of the arc length is in the low pressure supersonic zone. No sharp corners are present, and the region of diffuse arc attachment is controlled by appropriate choice of the sonic constrictor expansion angle prior to reaching the nozzle 66.

It is thought that the improved efficiency arcjet thruster of the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. In an arcjet thruster, the combination comprising:
   (a) means forming a tandemly-arranged constrictor and nozzle which together define an arc chamber, at least said nozzle being electrically conductive to define an anode, said constrictor including a generally annular-shaped portion formed of electrically insulative material disposed in the subsonic zone between said cathode tip and said nozzle anode;
   (b) an elongated member having a tip disposed adjacent to and spaced upstream from said constrictor, said member being electrically conductive to define a cathode spaced from said anode by a gap generally coextensive with said arc chamber;
   (c) means for applying an electrical potential to said anode and cathode so as to generate an electrical arc in said arc chamber from said cathode to said anode; and
   (d) means for supplying preheated constituent gases of a catalytically decomposed monopropellant to said arc chamber via said constrictor concurrently with the generation of said arc so as to produce thermal heating of said gases in said chamber and expansion thereof through said nozzle.

2. The arcjet thruster as recited in claim 1, wherein said constrictor includes:
   (e) means defining an electrically-conductive extension of said nozzle anode disposed in a fixed position along said insulative material of said constrictor, exposed to said arc chamber and axially extending between said cathode tip and nozzle anode so as to define an auxiliary gap with said cathode tip substantially smaller than said gap defined between said cathode and nozzle anode for facilitating startup of said arc generated from said cathode to said anode.

3. In an arcjet thruster, the combination comprising:
   (a) means forming a tandemly-arranged constrictor and nozzle which together define an arc chamber, at least said nozzle being electrically conductive to define an anode;
   (b) an elongated member having a tip disposed adjacent to and spaced upstream from said constrictor, said member being electrically conductive to define a cathode spaced from said anode by a gap generally coextensive with said arc chamber;
   (c) means for applying an electrical potential to said anode and cathode so as to generate an electrical arc in said are chamber form said cathode to said anode;
   (d) means for supplying preheated constituent gases of a catalytically decomposed monopropellant to said arc chamber via said constrictor concurrently with the generation of said arc so as to produce thermal heating of said gases in said chamber and expansion thereof through said nozzle; and
   (e) an electrically-conductive electrode disposed therein; and means for varying the electrical potential of said electrode so as to vary the shape of said arc generated in said arc chamber.

4. In an arcjet thruster, the combination comprising:
   (a) means forming a tandemly-arranged constrictor and nozzle which together define an arc chamber, at least said nozzle being electrically conductive to define an anode;
   (b) an elongated member having a tip disposed adjacent to and spaced upstream from said constrictor, said member being electrically conductive to define a cathode spaced from said anode by a gap generally coextensive with said arc chamber;
   (c) means for applying an electrical potential to said anode and cathode so as to generate an electrical arc in said arc chamber from said cathode to said anode; and
   (d) means for supplying a flowing gas to said arc chamber via said constrictor concurrently with the generation of said arc so as to produce thermal heating of said flowing gas in said chamber and expansion thereof through said nozzle;
   (e) said constrictor including
      (i) a generally annular-shaped portion formed of electrically insulative material disposed between said cathode tip and said nozzle anode, and
      (ii) means defining an electrically-conductive extension of said nozzle anode disposed in a fixed position along said insulative material of said constrictor, exposed to said arc chamber and axially extending between said cathode tip and nozzle anode so as to define an auxiliary gap with said cathode tip substantially smaller than said gap defined between said cathode and nozzle anode for facilitating startup of said arc generated from said cathode to said anode.

5. In an arcjet thruster, the combination comprising:
   (a) means forming a tandemly-arranged constrictor and nozzle which together define an arc chamber, at least said nozzle being electrically conductive to define and anode;
   (b) an elongated member having a tip disposed adjacent to and spaced upstream from said constrictor, said member being electrically conductive to define a cathode spaced from said anode by a gap generally coextensive with said arc chamber;
   (c) means for applying an electrical potential to said anode and cathode so as to generate an electrical arc in said arc chamber from said cathode to said anode;
   (d) means for supplying a flowing gas to said arc chamber via said constrictor concurrently with the generation of said arc so as to produce thermal heating of said flowing gas in said chamber and expansion thereof through said nozzle; and
   (e) said constrictor including:
      (i) a generally annular-shaped portion formed of electrically insulative material disposed between said cathode tip and said nozzle anode, and (ii) means defining an electrically-conductive extension of said nozzle anode disposed in a fixed position along said insulative material of said constrictor, exposed to said arc chamber and axially extending between said cathode tip and nozzle anode so as to define an auxiliary gap with said cathode tip substantially smaller than said gap defined between said cathode and nozzle anode for facilitating startup of said arc generated form said cathode to said anode, and (iii) means defining an electrically-conductive electrode disposed therein; and means for varying the electrical potential of said electrode so as to vary the shape of said arc generated in said arc chamber.

6. In a arcjet thruster, the combination comprising:

(a) means forming a tandemly-arranged constrictor and nozzle which together define an arc chamber, at least said nozzle being electrically conductive to define an anode;

(b) an elongated member having a tip disposed adjacent to and spaced upstream from said constrictor, said member being electrically conductive to define a cathode spaced from said anode by a gap generally coextensive with said arc chamber;

(c) means for applying an electrical potential to said anode and cathode so as to generate an electrical arc in said arc chamber from said cathode to said anode;

(d) means for supplying a flowing gas to said arc chamber via said constrictor concurrently with the generation of said arc so as to produce thermal heating of said flowing gas in said chamber and expansion thereof through said nozzle;

(e) said constrictor including an electrically-conductive electrode disposed therein; and (f) means for varying the electrical potential of said electrode so as to vary the shape of said arc generated in said arc chamber.

* * * * *

UNITED STATES PATENT AND TRADEMARK OFFICE
CERTIFICATE OF CORRECTION

PATENT NO. : 4,800,716

DATED : January 31, 1989

INVENTOR(S) : Steven C. Knowles and William W. Smith

It is certified that error appears in the above-identified patent and that said Letters Patent is hereby corrected as shown below:

On the title page:

The title page should be deleted to appear as per attached title page.

Revise the last sentence in the third full paragraph in column 6, lines 36 through 39 to read:
-- As mentioned above, the floating electrode 42 is optional.--

Corrected drawing Figure 1 as shown on attached page.

Signed and Sealed this

Twenty-fourth Day of April, 1990

Attest:

HARRY F. MANBECK, JR.

Attesting Officer

Commissioner of Patents and Trademarks

United States Patent [19]

Smith et al.

[11] Patent Number: 4,800,716
[45] Date of Patent: Jan. 31, 1989

[54] EFFICIENCY ARCJET THRUSTER WITH CONTROLLED ARC STARTUP AND STEADY STATE ATTACHMENT

[75] Inventors: William W. Smith; Steven C. Knowles, both of Seattle, Wash.

[73] Assignee: Olin Corporation, Stamford, Conn.

[21] Appl. No.: 889,451

[22] Filed: Jul. 23, 1986

[51] Int. Cl.$^4$ ............................................. F03H 1/00
[52] U.S. Cl. ............................ 60/203.1; 219/121.57; 313/231.41
[58] Field of Search .................. 60/203.1; 313/231.41, 313/231.51; 219/121 PW, 122

[56] References Cited

U.S. PATENT DOCUMENTS

| | | | |
|---|---|---|---|
| 2,850,662 | 9/1958 | Gilruth et al. | 60/203.1 |
| 3,353,060 | 11/1967 | Yamamoto et al. | 219/121 PW |
| 3,359,734 | 12/1967 | Ferrie et al. | 60/203.1 |
| 3,425,223 | 2/1969 | Browning | 60/203.1 |
| 3,651,644 | 3/1972 | Breen et al. | 60/203.1 |
| 3,692,431 | 9/1972 | Gebel | 60/203.1 |
| 4,370,539 | 1/1983 | Garlanov et al. | 219/121 PW |
| 4,577,461 | 3/1986 | Cann | 60/203.1 |

FOREIGN PATENT DOCUMENTS

1368255  1/1964  France ......................... 60/203.1

*Primary Examiner*—Louis J. Casaregola
*Attorney, Agent, or Firm*—Bruce E. Burdick

[57] ABSTRACT

An improved efficiency arcjet thruster has a constrictor and electrically-conductive nozzle anode defining an arc chamber, and an electrically-conductive rod having a tip spaced upstream from the constrictor and defining a cathode spaced from the anode by a gap generally coextensive with the arc chamber. An electrical potential is applied to the anode and cathode to generate an electrical arc in the arc chamber from the cathode to anode. Catalytically decomposed hydrazine is supplied to the arc chamber with generation of the arc so as to produce thermal heating and expansion thereof through the nozzle. The constrictor can have a electrically insulative portion disposed between the cathode tip and the nozzle anode, and an electrically-conductive anode extension disposed along the insulative portion so as to define an auxiliary gap with the cathode tip substantially smaller than the gap defined between the cathode and nozzle anode for facilitating startup of arc generation. The constrictor can also include an electrically-conductive electrode with a variable electrical potential to vary the shape of the arc generated in the arc chamber. Also, the cathode is mounted for axial movement such that the gap between its tip and the nozzle anode can be varied to facilitate a generally nonerosive generation of the electrical arc at startup and reliable steady state operation. Further, the arc chamber can have a nonparallel subsonic-to-supersonic transition configuration, or alternatively solely a nonparallel supersonic configuration, for improved arc attachment.

6 Claims, 3 Drawing Sheets

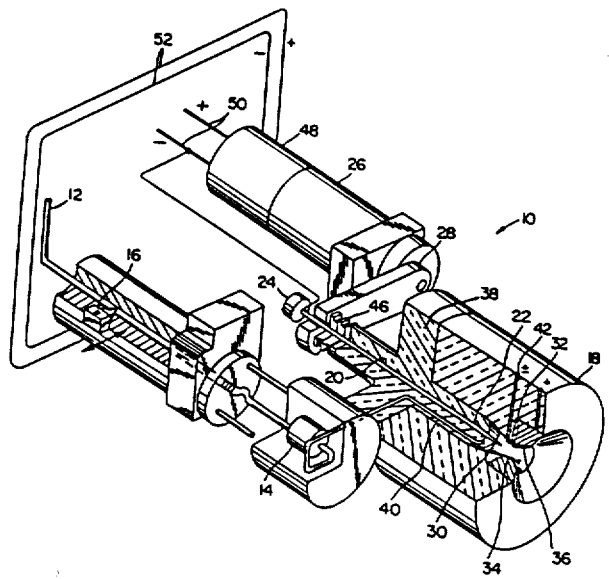

UNITED STATES PATENT AND TRADEMARK OFFICE
CERTIFICATE OF CORRECTION

PATENT NO. : 4,800,716

DATED : January 31, 1989

INVENTOR(S) : Steven C. Knowles and William W. Smith

It is certified that error appears in the above-identified patent and that said Letters Patent is hereby corrected as shown below:

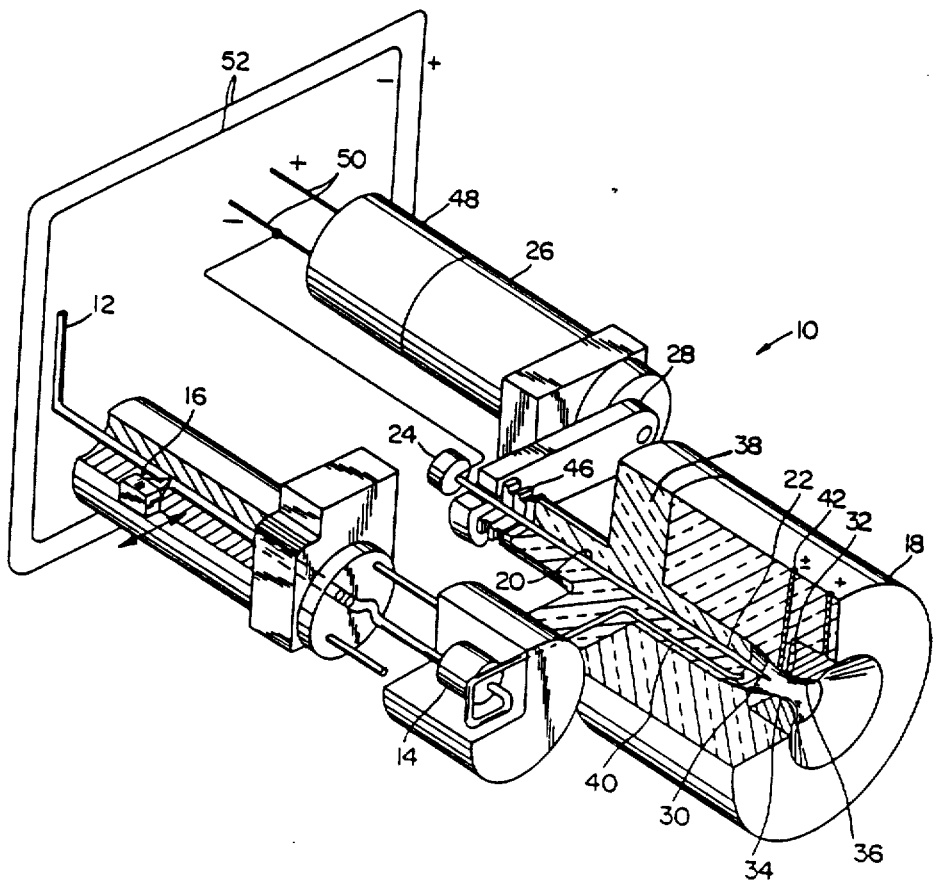

FIG.1